US012651906B2

(12) United States Patent
Amer et al.

(10) Patent No.: US 12,651,906 B2
(45) Date of Patent: Jun. 9, 2026

(54) DEEP REINFORCEMENT LEARNING AGENT FOR DEMAND RESPONSE IN HOME ENERGY MANAGEMENT SYSTEMS

(71) Applicants:QATAR FOUNDATION FOR EDUCATION, SCIENCE AND COMMUNITY DEVELOPMENT, Doha (QA); QATAR UNIVERSITY, Doha (QA)

(72) Inventors: Aya Amer, Doha (QA); Khaled Shaban, Doha (QA); Ahmed Massoud, Doha (QA)

(73) Assignees: Qatar Foundation for Education, SCience and Community Development, Doha (QA); Qatar University, Doha (QA)

( * ) Notice: Subject to any disclaimer, the term of this patent is extended or adjusted under 35 U.S.C. 154(b) by 420 days.

(21) Appl. No.: 18/242,909

(22) Filed: Sep. 6, 2023

(65) Prior Publication Data

US 2024/0079875 A1     Mar. 7, 2024

Related U.S. Application Data

(60) Provisional application No. 63/404,341, filed on Sep. 7, 2022.

(51) Int. Cl.
  *H02J 3/17*          (2026.01)
  *H02J 3/00*          (2026.01)
(52) U.S. Cl.
  CPC ............... *H02J 3/17* (2026.01); *H02J 3/003* (2020.01)
(58) Field of Classification Search
  CPC ............... H02J 3/144; H02J 3/003; H02J 3/14
  See application file for complete search history.

(56) References Cited

U.S. PATENT DOCUMENTS 10,395,552 B2     8/2019  Clark et al.
11,360,447 B2     6/2022  Park et al.
        (Continued)

FOREIGN PATENT DOCUMENTS

CN        110232483 A      9/2019
CN        114386646 A      4/2022
KR        101878708 B1     8/2018

OTHER PUBLICATIONS

Amer et al., "DRL-HEMS: Deep Reinforcement Learning Agent for Demand Response in Home Energy Management Systems Considering Customers and Operators Perspectives", IEEE Transactions on Smart Grid (2023), 14(1), pp. 239-250.

(Continued)

*Primary Examiner* — Charles Cai
(74) *Attorney, Agent, or Firm* — K&L Gates LLP

(57)                ABSTRACT

Deep reinforcement learning agents for demand response in home energy management systems are provided via training an agent via power availability data, electricity use data for an electrical load in a household, and an effect on a length of service of a power supply device to optimize a reward function that rewards: reduced electricity usage at peak demand times for the power grid according to the power availability data, increased user satisfaction with activation of the electrical load, and increased length of service for electrical devices used to delivery electricity to the electrical load; deploying the agent to the household; and activating electrical devices that are part of the electrical load for the household according to a schedule generated to optimize the reward function for delivery of power from at least one of the power grid and the power supply device to the household.

17 Claims, 6 Drawing Sheets

(56)           References Cited

U.S. PATENT DOCUMENTS

| | | | |
|---|---|---|---|
| 2010/0036779 A1* | 2/2010 | Sadeh-Koniecpol ... | H04L 63/20 |
| | | | 709/224 |
| 2016/0363980 A1* | 12/2016 | Spiel | G06F 1/3206 |
| 2019/0372345 A1 | 12/2019 | Bain et al. | |
| 2021/0003974 A1* | 1/2021 | Yang | G06N 3/0455 |
| 2021/0173366 A1* | 6/2021 | Turney | G05B 19/042 |
| 2021/0390206 A1 | 12/2021 | Miron et al. | |
| 2022/0041076 A1* | 2/2022 | Sadeghianpourhamami | |
| | | | G06Q 50/40 |
| 2024/0302243 A1* | 9/2024 | McCarthy | G01M 3/26 |

OTHER PUBLICATIONS

Amer et al., "Home Energy Management System Embedded with a Multi-Objective Demand Response Optimization Model to Benefit Customers and Operators", Energies (2021), 14(2), pp. 1-19.

Chiş et al. "Reinforcement Learning-Based Plug-in Electric Vehicle Charging With Forecasted Price", IEEE Transactions on Vehicular Technology (2017), 66(5), pp. 3674-3684.
Ding et al., "Event Detection with Trigger-Aware Lattice Neural Network", Proceedings of the 2019 Conference on Empirical Methods in Natural Language Processing and the 9th International Joint Conference on Natural Language Processing (EMNLP-IJCNLP), Hong Kong, China, Association for Computational Linguistics. pp. 347-356.
Levy et al., "Understanding Conflicts in Online Conversations", Proceedings of the ACM Web Conference 2022 (WWWWW '22), Apr. 25-29, 2022, Virtual Event, Lyon, France. ACM, New York, NY, USA, pp. 2592-2602.
Meng et al., "Predicting Hate Intensity of Twitter Conversation Threads", Knowledge-Based Systems (2023), vol. 275, pp. 1-39.
M'hamdi et al., "Contextualized Cross-Lingual Event Trigger Extraction with Minimal Resources", Proceedings of the 23rd Conference on Computational Natural Language Learning, Hong Kong, China, Nov. 3-4, 2019. Association for Computational Linguistics, pp. 656-665.

* cited by examiner

300

310    Train Agent According to Reward Function

320    Deploy Agent to Manage Electrical Devices in Household

330    Activate Deactivate Electrical Devices based on Environmental Conditions

340    Receive Feedback and Additional Power Data

400

410  Observe State

420  Take Action

430  Receive Reward          Operations

440  Draw-Mini Batch at Random from Memory

440  Update Neural Network

Training, if iteration < i

To/From Other Devices

DEEP REINFORCEMENT LEARNING AGENT FOR DEMAND RESPONSE IN HOME ENERGY MANAGEMENT SYSTEMS

CROSS-REFERENCES TO RELATED APPLICATIONS

The present disclosure claims the benefit of U.S. Provisional Patent Application No. 63/404,341 entitled "DEEP REINFORCEMENT LEARNING AGENT FOR DEMAND RESPONSE IN HOME ENERGY MANAGEMENT SYSTEMS" and filed on Sep. 7, 2022, which is incorporated herein by reference in its entirety.

TECHNICAL FIELD

The present disclosure relates to a software tools to improve operations of homes in managing energy consumption and generation.

SUMMARY

The present disclosure provides new and innovative systems and methods for control of a home energy management system (HEMS) to control power consumption, generation, and storage at a home/business connected to a power grid. An artificial intelligence (AI) agent is provides that uses two neural networks to select from different goals to improve the deep learning network at different times, thereby focusing the work to a single goal at a time (reducing computing resources) and incorporating transformer load as a reward function, thereby avoiding multiple households inducing new peak energy demands on the grid by attempting to individually maximize energy efficiency by the same way at the same time. Accordingly, the described agent may be used to increase user satisfaction and the length-of-service (LoS) of various electrical devices in different households connected to the same power grid, as well as other operational benefits, when competing with multiple instances of the described agent observing the same input data and other actors who may be operating under similar input data and goals without establishing communications among the agents.

In various aspects, a method, a system for performing the method, and various goods produced by the method are provided. In various aspects, the method includes: training an agent via power availability data, electricity use data for an electrical load in a household, and an effect on a length of service of a power supply device to optimize a reward function, wherein the reward function rewards: reduced electricity usage at peak demand times for the power grid according to the power availability data, increased user satisfaction with activation of the electrical load, and increased length of service for electrical devices used to delivery electricity to the electrical load; deploying the agent to the household that is connected to a power grid; and activating electrical devices that are part of the electrical load for the household according to a schedule generated to optimize the reward function for delivery of power from at least one of the power grid and the power supply device to the household.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
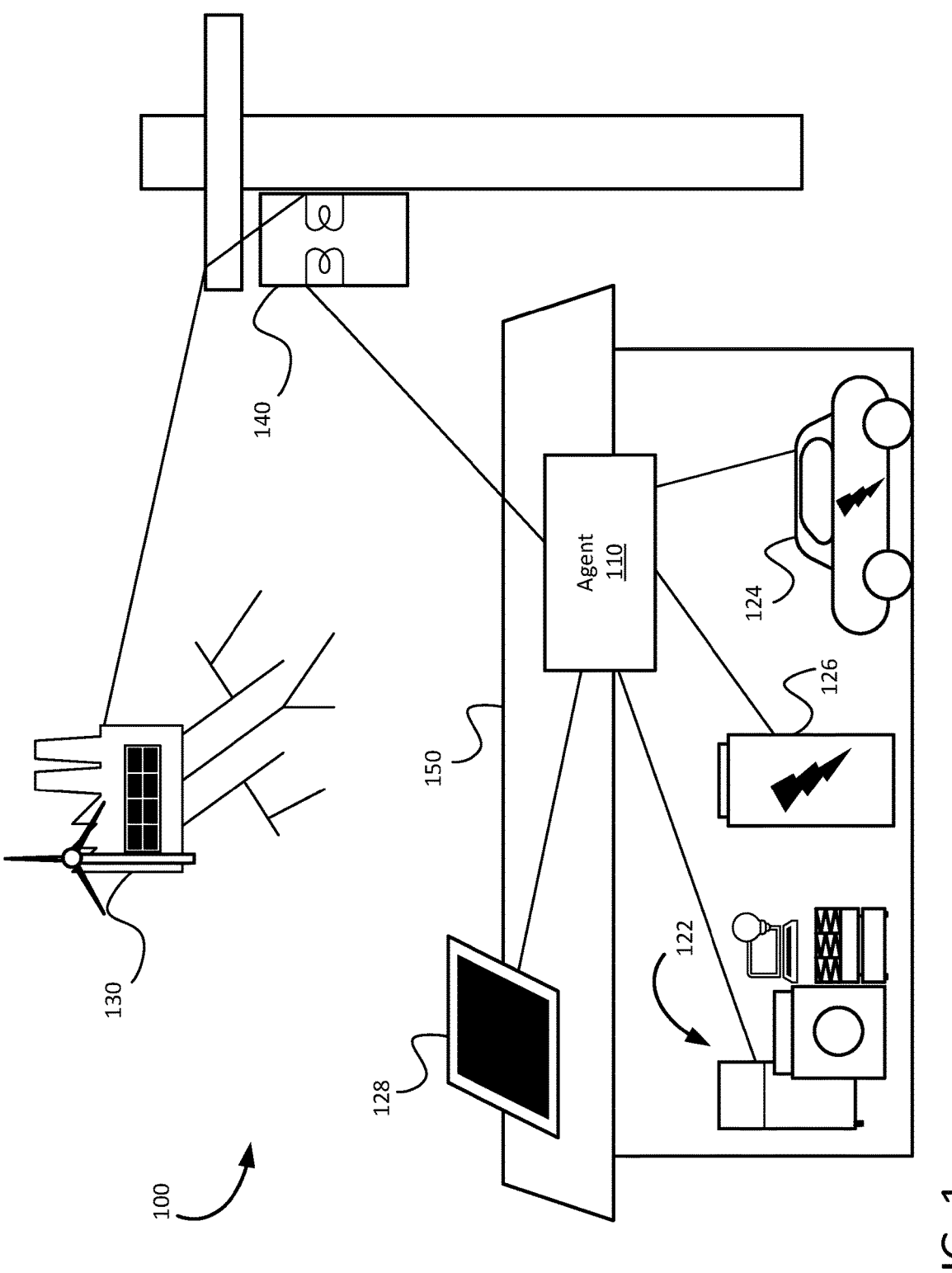
FIG. 1 illustrates an example household, in which a trained multi-objective Deep Reinforcement Learning (DRL) HEMS agent may be deployed, according to embodiments of the present disclosure.

The present disclosure provides new and innovative systems and methods for control of a home energy management system (HEMS) to control power consumption, generation, and storage at a home/business connected to a power grid. An artificial intelligence (AI) agent is provides that uses two neural networks to select from different goals to improve the deep learning network at different times, thereby focusing the work to a single goal at a time (reducing computing resources) and incorporating transformer load as a reward function, thereby avoiding multiple households inducing new peak energy demands on the grid by attempting to individually maximize energy efficiency by the same way at the same time. Accordingly, the described agent may be used to increase user satisfaction and the length-of-service (LoS) of various electrical devices in different households connected to the same power grid, as well as other operational benefits, when competing with multiple instances of the described agent observing the same input data and other actors who may be operating under similar input data and goals without establishing communications among the agents.

With recent developments and advances in Machine Learning (ML), Internet-of-things (IOT or IoT) technologies, and smart metering infrastructures, performing load control for residential users has become possible by scheduling real-time household consumption via Home Energy Management Systems (HEMSs). The HEMSs incorporate Demand Response (DR) techniques that optimize household energy consumption. Developing an effective HEMS can achieve various objectives for both end-users and power utilities, such as financial profits, energy savings, comfort and convenience, greenhouse gas emissions minimization, as well as increasing the utilization of energy storage systems (ESSs) and renewable energy resources (RERs).

As used herein, the term "optimize" and variations thereof, is used in a sense understood by data scientists to refer to actions taken for continual improvement of a system relative to a goal. An optimized value will be understood to represent "near-best" value for a given reward framework, which may oscillate around a local maximum or a global maximum for a "best" value or set of values, which may change as the goal changes or as input conditions change. Accordingly, an optimal solution for a first goal at a given time may be suboptimal for a second goal at that time or suboptimal for the first goal at a later time.

Many studies have aimed to develop HEMSs with centralized and deterministic optimization approaches. These optimization approaches include models for scheduling the consumption of different household appliances (e.g., washing machines, clothes dryers, dishwashers, air conditioners, electric kettles, laptops, clocks, microwaves, etc.), but such limitations are often frustrating to users who need to use certain appliances at specific times. Additionally, traditional model-based algorithms that use mathematical models that require a more profound knowledge of the problem and/or impose more assumptions. For example, the model dynamics have to be represented with high precision by knowing all the environment information, limiting its application on large-scale and dynamic systems, where the system parameters could be partially or completely unknown or varying. Thus, the accuracy of the model-based HEMS cannot be guaranteed since the household appliances' efficiency, and different variables vary over time. Also, these techniques may suffer from high complexity and computational cost in realtime applications due to a large number of involved variables.

The present disclosure therefore provides a multi-objective Deep Reinforcement Learning (DRL) HEMS that is a model-free DRL-based system to optimize energy consumption using a deep Q-network (DQN) algorithm. The described system provides a single agent that uses a reduced number of state-action pairs to reduce the computational burden of DRL, thus alleviating the curse of dimensionality problems encountered by prior DRL-HEMS schemes. Additionally, the model supports bi-directional power flow between Distributed Energy Resources (DER) and the loads, which can include Electric Vehicle (EV) and Energy Storage Systems (ESS) in the household to control charging and discharging actions by satisfying certain constraints. These and other benefits to users or utilities, improvements to underlying computing systems, and efficiencies in power generation and storage will be recognized by persons having the appropriate skill in the related arts upon detailed reading of the present disclosure.

FIG. 1 illustrates an example household 150, in which a trained multi-objective Deep Reinforcement Learning (DRL) HEMS agent 110 may be deployed, according to embodiments of the present disclosure. Although illustrated as a single-family home, the household 150 may be a duplex, divided home, apartment, condominium, mixed-use dwelling/business, business, or another occupied building. The household 150 is connected to a power grid 130 operated by a utility (e.g., outside of household control) that supplies power to the household 150 (and various neighboring or nearby households) via a transformer 140. Each of the household 150 and the transformer 140 are considered to be in the same environment 100 as one another, and are expected to experience similar weather (e.g., external temperatures, precipitation) as one another.

The agent 110 observes the usage patterns in the household 150 for various appliances 122 (e.g., air conditioning or heating units, washing machines, dishwashers, electric water heaters, electric ovens/ranges, lights, fans, computing devices, etc.), EV 124 (if part of the household), ESS 126 (if part of the household), photovoltaic (PV) or other renewable or powered generators 128 under the control of the household 150 (the appliances 122, EVs 124, ESS 126 and generators 128 collectively referred to as electrical devices 120) to learn the usage patterns of the members of the household.

Each of these categories is represented via an operational state, noting which devices have time-shiftable loads, and which have time-fixed or inconsistent loads or output curves, including power shifting (e.g., running at a power level between 100% on and 100% off). These loads/outputs are analyzed as an optimization problem against various goals (e.g., maximizing user comfort, minimizing power consumption, maximizing LoS for the devices, etc.) that may be in competition with one another. For example, a house that is electrically heated may very comfortable in the winter if constantly heated to be very warm inside, but constantly running a heating system may consume large amounts of electricity and reduce the life of the heating elements, compared to sporadically heating the house. Similarly, that same house may have very low electricity consumption and near indefinite LoS for the heating elements if not heated at all in the winter, but the owners of the house may be very uncomfortable.

To handle the opposing goal conditions, while providing a manageable data set for the agent 110 to analyze and provide outputs for, the DR problem is considered as a Markov Decision Process (MDP), which means that the transition state only depends on the present state and action. The MDP of the problem structured to have three elements: an action set A, a state set S, and a reward R.

The action set combines the different actions that can be carried by the agent 110 for each electrical device 120. The action depends on the environment state defined in the previous section. The agent 110 should perform the binary action {1, 0} to turn on or off the time-shiftable electrical devices 120, which consume constant energy. The action set for controllable appliances 122 is discretized into N power consumption levels.

The reward function should reflect the optimization problem objectives. Thus, the reward function is formulated as the electricity cost, resident dissatisfaction cost (RDC), and transformer LoS cost. Unlike traditional methods formulating the user dissatisfaction model, the present disclosure encapsulates users' dissatisfaction into the reward function. The agent 110 gradually learns the user's electricity consumption habits through continuous interaction with the environment. Using multiple reward functions, the HEMS is designed as a multi-objective optimization problem. Three joint reward components are considered to achieve the three objectives of the optimization problem, as presented in Formula 1, where $C_t^{elec}$ is the electricity cost, $C_t^{RDc}$ is an index of discomfort to the resident by the DR scheduling, $C_t^{LoS}$ presents the transformer degradation cost for the length of service, and µ1, µ2, and µ3, are weighting factors.

$$r_t = \mu_1 C_t^{elec} + \mu_2 C_t^{RDC} + \mu_3 C_t^{LoS}, \forall t \qquad \text{[Formula 1]}$$

The electricity operational cost is determined by the electricity market price at time t charged with the real-time price (RTP) tariff. The RDC index considers: i) undesired operation cost for the time-shiftable appliances, ii) the thermal discomfort of the controllable appliances, and iii) the energy use of the EV and ESS. Formula 3 reflects the RDC in the scheduling program to presents the resident's discomfort due to waiting for the appliance to start operating in a shared unit of currency per kilowatt hour, where $\zeta_n$ maps the discomfort level into cost actions (in currency) for various states of energy (SOE).

$$C_t^{RDC} = \zeta_n(SOE_t - SOE_{max})^2, \ t = t_{b,n} \qquad \text{[Formula 3]}$$

If an EV 124 is available, the charging action is rewarded when the electricity price is low. Conversely, the discharging action is rewarded when the electricity price is high. Additionally, the model used by the agent 110 introduces penalties for not fully charging the battery of the EV 124 at departure time. In various embodiments, the battery of the EV 124 is treated as a special case of an ESS 126.

If an ESS 126 is available, energy use is considered as part of the reward function to prevent undercharging or overcharging of the ESS 126. Considering the integration of PV and DR programs, the transformer loading pattern will change. The DR program aims to schedule the appliances' operation at the lowest-price period. However, because of the high penetration of the operated home appliances 122 around these periods, there is a risk of making new power peaks, leading to overloading the distribution transformer 140. Therefore, different PV and DR penetration levels will contribute to different load profiles and, consequently, to the different lifetime spans of a distribution transformer 140. Hence the transformer LoS degradation cost is introduced in the reward function. The distribution transformer LoS % depends on three variables: ambient temperature, winding hottest-spot temperature, and top oil temperature. Based on the price signal and transformer loading levels received from the utility, the agent 110 schedules the load at low price periods without overloading the distribution transformer 140 during these periods, which can improve the transformer usage during abnormal and emergency periods and prolong the life of the transformer 140.

Figure 2A:
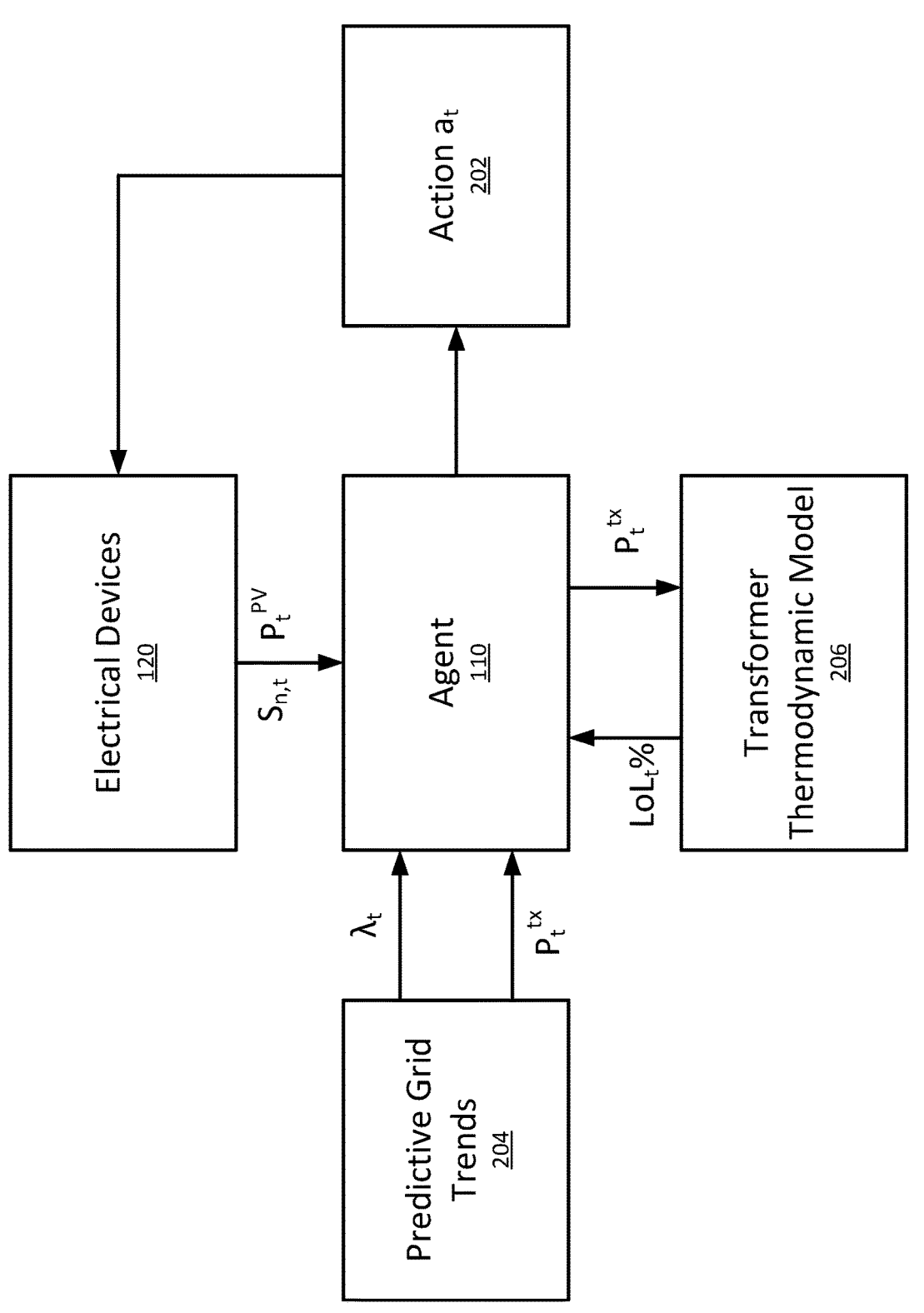
FIGS. 2A and 2B illustrate conceptual diagrams for decision processing for the agent, according to embodiments of the present disclosure.
Figure 2B:
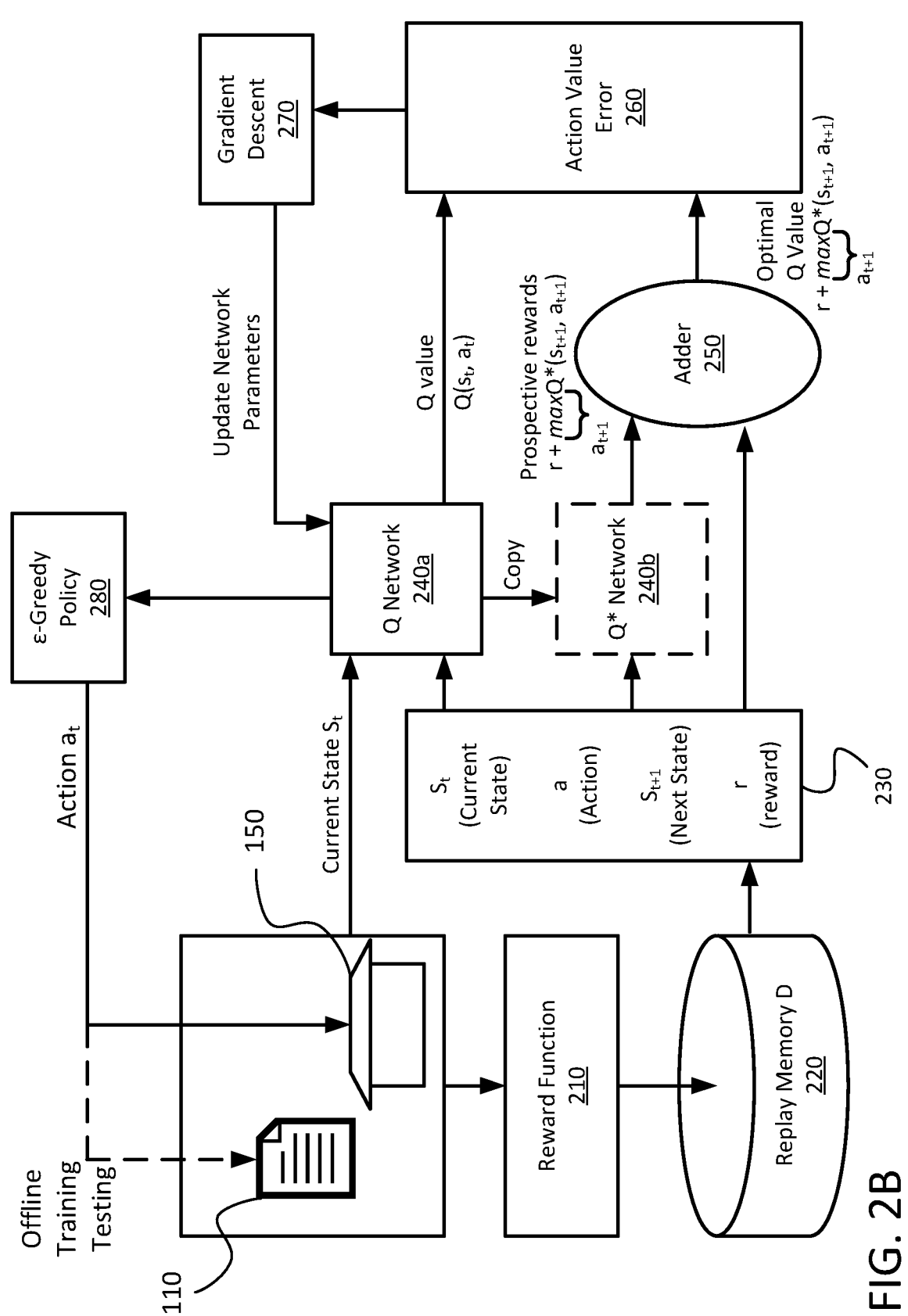

FIGS. 2A and 2B illustrate conceptual diagrams for decision processing for the agent 110, according to embodiments of the present disclosure.

FIG. 2A shows several inputs and outputs to the agent 110 and the electrical devices 120 in the household 150, according to embodiments of the present disclosure. The electrical devices 120 sent the agent 110 state information at various times ($S_{n,t}$) and power generation ($P_t^{Pv}$) at various times for any generators included in the electrical devices (e.g., PV generators). In turn, the agent 110 signals one or more of the electrical devices 120 with various actions 202 at various times (a t) which are used for the optimization of power consumption in the household, user comfort, and transformer load. These actions can include the activation, deactivation, partial activation/deactivation, and re-scheduling of various scheduled actions to a different time period.

To better inform the selected actions 202 and account for load and length of life for the transformer 140, the agent 110 also receives predictive grid trends 240 for the power grid 130, which may include predictive values for electricity pricing ($\lambda_t$) in the upcoming time period (e.g., the next 30 minutes, hour, two hours, etc.) and transformer load ($P_t^{tx}$), and references a thermodynamic model 206 for the transformer 140, which may include a loss of life at a given time ($LoL_t$) for the expected load on that transformer 140 at the predicted time ($P_t^{tx}$).

FIG. 2B shows a DRL-based framework for the agent, according to embodiments of the present disclosure. During deployed operations, a Q network 240a receives current state information from the environment 100 (e.g., the household 150 managed by the agent 110) to determine an action at to perform according to an ε-greedy policy 280, such as outlined with reference to FIG. 2A. The agent 110 judges the actions taken according to a reward function 210, and stores a tuple 230 of the action, initial and final states for an action time period, and associated reward values from the reward function 210 in a replay memory D 220. The tuple 230 may then be fed back into the Q network 240a to adjust how the Q network selects the next set of actions to take for the next time period.

During learning/training operations, a copy 240b of the Q network 240a is generated, and is also supplied with the tuple 230. An adder 250 compares the tuple 230 with the prospective rewards (e.g., r+maxQ*($s_{t+1}$, $a_{t+1}$)) for the next time period generated by the copy 240b to identify an optimal Q value (r+maxQ*($s_{t+1}$, $a_{t+1}$)). An action value error 260 between the action chosen by the Q network 240a (Q($s_t$, $a_t$) and optimal action a t for a given time is calculated, and a gradient descent parameter 270 is fed back to the Q network 240a to update (e.g., teach or train) the Q network 240a.

Figure 3:
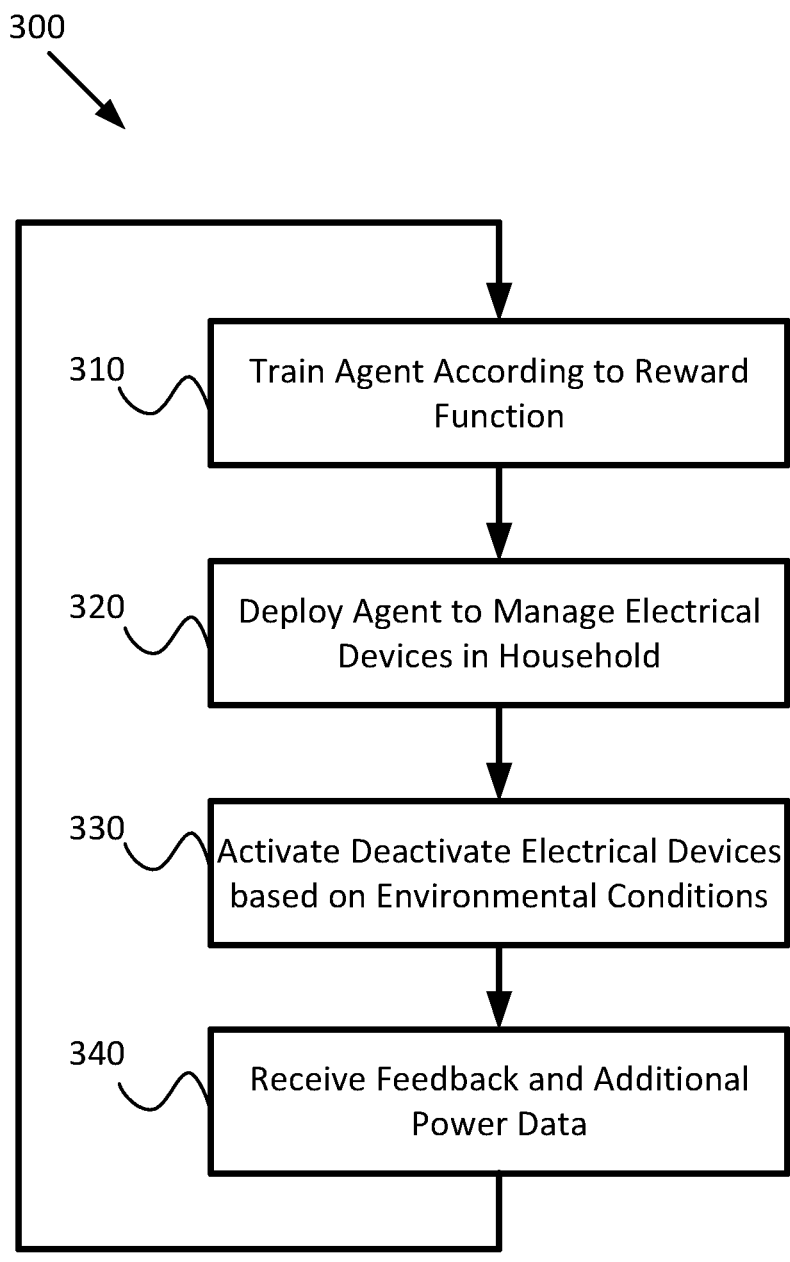
FIG. 3 is a flowchart of an example method for the training and deployment of an agent, according to embodiments of the present disclosure.

FIG. 3 is a flowchart of an example method 300 for the training and deployment of an agent 110, according to embodiments of the present disclosure.

At block 310, the agent 110 is trained according to a reward function. The agent 110 aims to optimize the power consumption of household appliances while considering different constraints. The agent 110 achieves the objective by interacting with the household electrical devices 120 in a sequence of decision episodes. These decision episodes are split into a sequence of timesteps. Every timestep, the agent 110 receives a representation of the state of the environment 100 and the electrical devices 120 and takes action. As a result of the selected actions, the agent 110 is rewarded or penalized. The interaction continues until the agent 110 reaches a terminal state. After training using an offline dataset, the agent 110 can be deployed in a real environment. If environmental changes occur, the agent 110 actions signaled to the electrical devices 120 of the household 150 by interacting with the new environment to increase the obtained reward and restore the optimization effect.

For example, consider the operation of the HEMS agent for i time steps, the agent 110 seeks to maximize the accumulative reward R. The combination of each possible state and action value forms a larger number of state-action pairs. In this high-dimensional space, the agent 110 learning would be too slow to provide realtime predictive control. Therefore, conventional RL agents (e.g., Q-learning) are impractical when the state and action spaces are in high dimensions. The agent 110 therefore uses DQN, where one difference between Q-learning and DQN is that the agent 110 in Q-learning uses a Q-table, but in DQN, it is a Deep Neural Network (DNN) used to approximate the Q-value. The input of DQN is the environment states s! including electricity price, transformer load, and appliances states defined in section. The output is Q-value for each action a! that optimizes home consumption and minimizes the load on the transformer.

Figure 4:
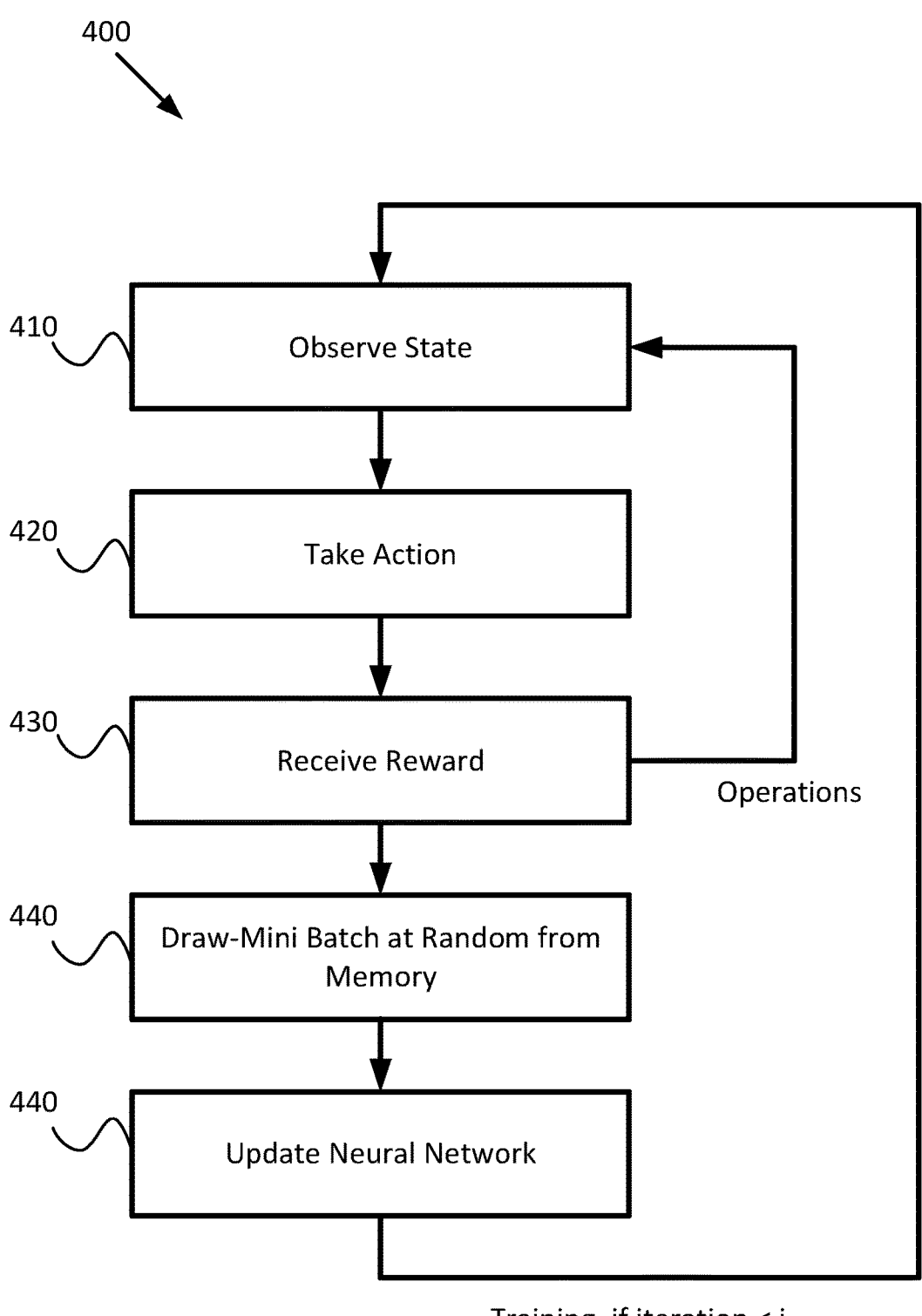
FIG. 4 is a flowchart of an example method of a DQN learning algorithm, according to embodiments of the present disclosure.

FIG. 4 is a flowchart of an example method 400 of a DQN learning algorithm, as may be used in block 310, according to embodiments of the present disclosure. When used for training, a first loop restricts the number of training episodes, while a second loop controls the load scheduling and power consumption management of every training episode. Within each training episode, the states are observed at block 410, and training is performed. Furthermore, the new environment states are observed. Specially, in the initial time slot, the agent 110 takes action at block 420, obtains a reward at block 430, and observes the following state by iterating method 400.

The state transition tuple is stored in memory, and a mini-batch is drawn randomly from memory at block 440, after which the neural network Q is updated at block 440. Method 400 may then loop (if the training loop permits) for the neural network to determine the following action based on the following state per following instances of block 410 and block 420.

In various embodiments, an $\epsilon$-greedy policy is used as an action selection strategy to select the optimum action. As the training starts, the agent can either explore the action space by randomly selecting an action with a probability of $\epsilon$ or select an action whose current Q-value is maximum, with a probability of $1-\epsilon$. After each iteration, the exploration rate $\epsilon$ is decreased by a decay rate until the exploration rate reaches a minimum value. This way, the agent has more probability of selecting different actions at the beginning.

The agent can be trained and tested on two different datasets, which may include a test dataset that has never been used in the training process. During training, the DQN agent gradually learns how to adapt to the environment and achieve higher rewards. Initially, the agent takes many random choices. After several episodes, the agent learns to select the actions that meet the optimization objective. Accordingly, the rewards increase gradually and converge after a number of iterations. After convergence, there are still variations in the obtained rewards. This is because of the differences in the electricity rates, environmental conditions, changes in user preferences for comfort, and the like.

At block 320, the agent 110 is deployed in an environment to manage electrical devices in a household. The agent 110 monitors the environment 100 (and the household 150 in particular) as a MDP, using the various actions available (e.g., to activate or deactivate various electrical devices 120, to modify an activation level of various electrical devices 120) and the current environmental conditions (e.g., time of day; external weather conditions; internal temperature for the household 150; electricity cost; electricity demand at the transformer 140; availability or charge levels of various ESS 126, generators 128, EVs 124; etc.) and the last actions taken to determine the current state to which the available actions can be applied.

At block 330, the agent 110 adjusts a usage pattern for various electrical devices 120 based on environmental conditions and the current state of the household to maintain/restore/increase an optimized reward function output. In various embodiments, the agent 110 may perform cycles of actions and observations according to block 410-330 as shown in FIG. 4 with respect to method 400. The actions signaled by the agent 110 may include activating, deactivating, changing a rate of usage (e.g., between 100% and 0% activation) of various electrical devices in the household. These actions may result in a greater load (e.g., charging an ESS, running an appliance) or a lesser load (e.g., halting an appliance, activating a generator, discharging an ESS) on a transformer servicing the household, ceteris paribus. Actions may be assigned by the agent 110 according to scheduled intervals (e.g., a new action every 15 minutes, every 40 minutes, every hour, every two hours, etc.) or in response to triggering events (e.g., an EV reconnects or disconnects from the household, a PV generator capacity change, start/stop of precipitation, a temperature threshold inside or outside the household being reached).

In various embodiments, the agent receives one-hour ahead of predicted data, including electricity price, PV generation, and transformer load and uses that to make load schedules to fulfill the optimization problem objectives (e.g., to observe a state per block 410). Different communication technologies can be used to enable two-way communication between the utility and the consumers. Specifically, the 5G network development has strengthened the infrastructure for DR programs with higher reliability, rapid data transfer, lower power consumption, expanded security, and a massive number of connections. Accordingly, several agents can share their schedules with the utility to bring generation capacity online or offline based on the aggregated predicted use characteristics.

At block 340, the agent 110 receives feedback (e.g., user discomfort level data) and additional power data, which are supplied as offline training data to further refine and update the training of the agent 110, when method 300 next returns to block 310. Because the agent 110 seeks to find an optimal point among several competing goals, and various households may have competing agents running similar models, several iterations of real-world optimization training may be required to settle on a "best fit" in a localized environment when the actions of the agents are outside of each others' control, but affect one another.

The HEMS agent may trigger the low-price periods to function as a sink, causing all users to schedule their loads during these periods, resulting in new power peaks. As a result of co-scheduling, the agents may inadvertently increase the load on the transformer. Correspondingly, the transformer's LoS factor during these periods will increase. Thus, the transformer LoS factor is incorporated in the reward function along with electricity and resident discomfort factors. The DRL-HEMS learns to satisfy the resident's needs and reduce the negative effect on the transformer's LoS by monitoring the electricity cost and the transformer load. To assess the agent's efficacy, the transformer load profile is considered with a serious loading condition where the transformer loading is above certain ratings (e.g., above 100%, above 80%) during certain time periods (e.g., between 1700-1900 hours, between 0800-1000 hours). Accordingly, various loads can be moved to time slots with higher electricity costs that other time slots to improve the overall reward function.

The DRL-HEMS agent can handle optimization problems and reduce costs under different scenarios. In the contrast to previous work that greedily attempts to lower the cost for a single agent, potentially resulting in each agent individually behaving rationally results in higher costs for themselves (e.g., forming new peaks) and the power grid as a whole, the DRL-HEMS agent provided herein uses the learned knowledge to select the actions that maximize the overall reward. The focus on the overall reward can reduce the formation of new demand peaks (when several agents attempt to use what they individually predict will be low cost electricity) and can improve the livability of the household and usefulness of the various systems powered therein, For example, the described agent provides a reduction of the electricity cost ratio of DRL-HEMS is only 4% less than previously observed "greedy" agents, but it achieves better rewards for thermal comfort, and EV anxiety ranges by 48% and 75%, respectively.

The load profile of the distribution transformer is considered in the DRL-HEMS model by incorporating the asset LoS cost into the reward function. The flexibility of the proposed model is facilitated by including various demand/generation components that consume/produce electricity. The agent performance is evaluated, and the results verify the economic benefits of the proposed algorithm to both the resident and utility compared to the conventional optimization solvers. The described DRL-HEMS is applied in two different scenarios and demonstrates the benefits for residents and operators in consumption cost, RDC, and transformer LoS cost. In conclusion, effective residential demand response programs can contribute to peak reduction, benefiting the end-user and the operator under varying circumstances (i.e., dynamic environment) without prior knowledge about the system. Meanwhile, the adaptiveness of the DRL model can provide significant benefits to the operator during abnormal conditions.

The present disclosure may be understood as a method including: training an agent via power availability data for a power grid managed by a utility, electricity use data for electrical devices in a household, and an effect on a length of service of a power supply device to optimize a reward function, wherein the reward function rewards: reducing electricity usage at peak demand times for the power grid according to the power availability data, increasing user satisfaction with activation of the electrical devices, and increasing length of service for a power supply device used to delivery electricity to the electrical load; deploying the agent to the household that is connected to a power grid managed by the utility to generate a schedule to optimize the reward function for delivery of power from at least one of the power grid and the power supply device to the household; and activating and deactivating the electrical devices for the household according to the schedule.

In various embodiments, the agent uses a Deep Q-network algorithm to generate an approximated Q value for a given tuple of current state, current action, next state, and reward function values.

In various embodiments, the electrical devices include appliances, an electric vehicle, and an energy storage solution. In various embodiments, the energy storage solution includes an electric vehicle that is disconnected from the household for at least part of a day.

In various embodiments, the power supply device includes a photovoltaic device managed by the household.

In various embodiments, the power supply device includes a transformer managed by the utility operating the power grid.

In various embodiments, the agent is updated based on operational feedback from the household and additional power availability data.

In various embodiments, the schedule is modeled as a Markov Decision Process for an action to take from a current state based on current environmental conditions to reach a prospective next state at an end of a scheduled time period to receive rewards based on an actual next state at the end of the scheduled time period.

In various embodiments, the user satisfaction is measured via user comfort feedback.

In various embodiments, the power supply device is a transformer serving a plurality of households, including the household, that the agent is trained to reduce loss of life for according to an electrical load exerted by the household on the transformer while greedily, relative to other houses of the plurality of households, attempting to reduce cost of use and increase user satisfaction for the household.

The present disclosure may be understood as a system, including: a processor; and a memory, instructions that when executed by the processor perform operations including: observing, by an agent, environmental states for a first time, the environmental states including states of electrical devices in a household, power availability data form a utility serving the household, and an effect on a length of service of a power supply device; taking, by the agent, an action for the electrical devices for a second time, subsequent to the first time, based on the environmental states for the first time; receiving, by the agent, a reward from a reward function for the agent, wherein the reward function rewards: reducing electricity usage at peak demand times for the utility according to the power availability data, increasing user satisfaction with activation of the electrical devices, and increasing length of service for the power supply device.

In various embodiments, the operations also include updating the agent based on operational feedback from the household and additional power availability data.

In various embodiments, the agent uses a Markov Decision Process based on the environmental states to identify what action to take from a first state to reach a prospective next state at an end of a scheduled time period to receive rewards based on an actual next state at the end of the scheduled time period.

In various embodiments, the user satisfaction is measured via user comfort feedback.

In various embodiments, the power supply device is a transformer serving a plurality of households, including the household, that the agent is trained to reduce loss of life for according to an electrical load exerted by the household on the transformer while greedily, relative to other houses of the plurality of households, attempting to reduce cost of use and increase user satisfaction for the household.

The present disclosure may be understood as a computer-readable storage device, including instructions that when executed by a processor perform operations including: observing, by an agent, environmental states for a first time, the environmental states including states of electrical devices in a household, power availability data form a utility serving the household, and an effect on a length of service of a power supply device; taking, by the agent, an action for the electrical devices for a second time, subsequent to the first time, based on the environmental states for the first time; receiving, by the agent, a reward from a reward function for the agent, wherein the reward function rewards: reducing electricity usage at peak demand times for the utility according to the power availability data, increasing user satisfaction with activation of the electrical devices, and increasing length of service for the power supply device.

In various embodiments, the operations also include updating the agent based on operational feedback from the household and additional power availability data.

In various embodiments, the agent uses a Markov Decision Process based on the environmental states to identify what action to take from a first state to reach a prospective next state at an end of a scheduled time period to receive rewards based on an actual next state at the end of the scheduled time period.

In various embodiments, the user satisfaction is measured via user comfort feedback.

In various embodiments, the power supply device is a transformer serving a plurality of households, including the household, that the agent is trained to reduce loss of life for according to an electrical load exerted by the household on the transformer while greedily, relative to other houses of the plurality of households, attempting to reduce cost of use and increase user satisfaction for the household.

Figure 5:
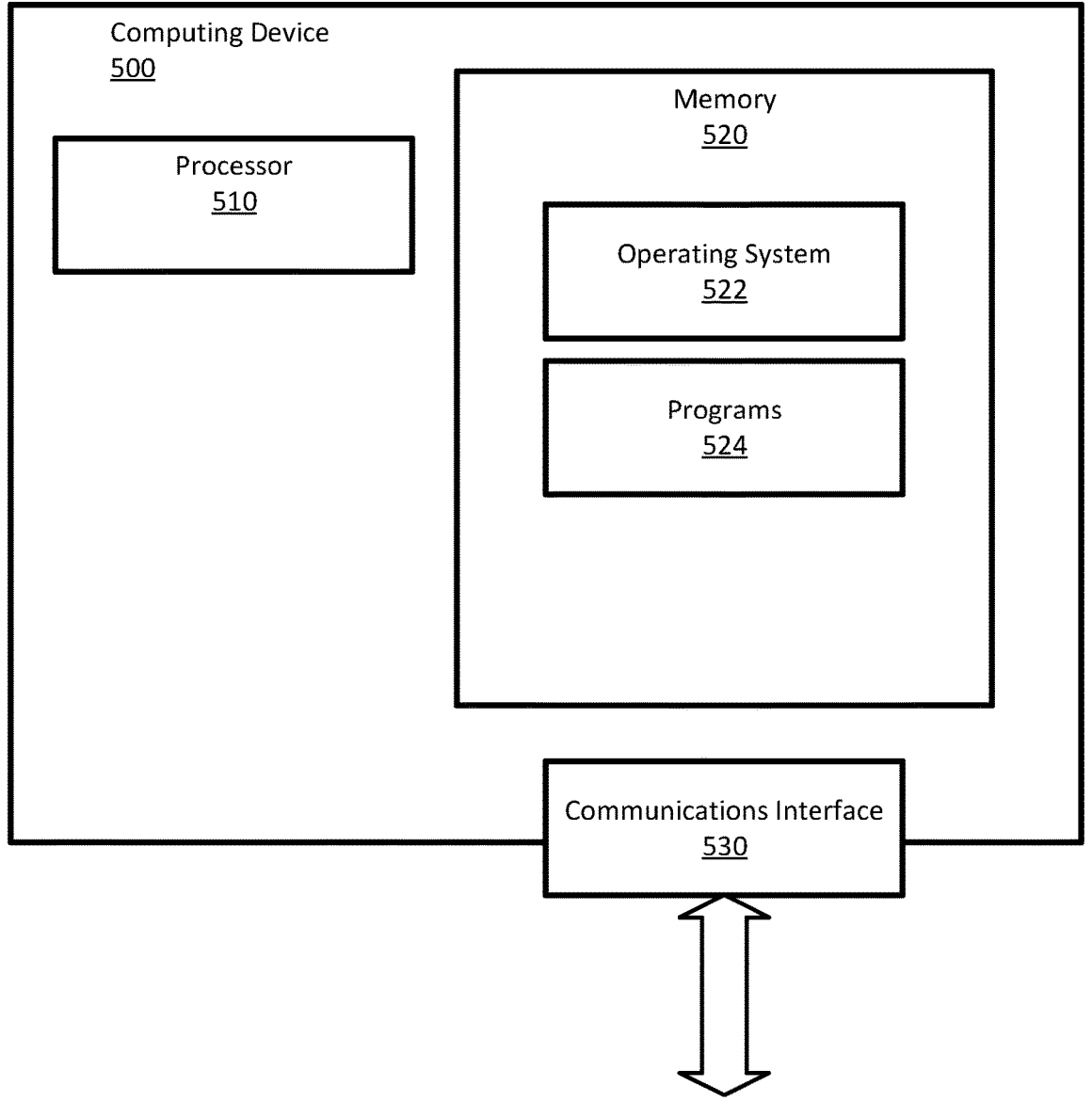
FIG. 5 illustrates a computing device, according to embodiments of the present disclosure.

FIG. 5 illustrates a computing device 500, as may be used to provide the agent 110, according to embodiments of the present disclosure. The computing device 500 may include at least one processor 510, a memory 520, and a communication interface 530.

The processor 510 may be any processing unit capable of performing the operations and procedures described in the present disclosure. In various embodiments, the processor 510 can represent a single processor, multiple processors, a processor with multiple cores, and combinations thereof.

The memory 520 is an apparatus that may be either volatile or non-volatile memory and may include RAM, flash, cache, disk drives, and other computer readable memory storage devices. Although shown as a single entity, the memory 520 may be divided into different memory storage elements such as RAM and one or more hard disk drives. As used herein, the memory 520 is an example of a device that includes computer-readable storage media, and is not to be interpreted as transmission media or signals per se.

As shown, the memory 520 includes various instructions that are executable by the processor 510 to provide an operating system 522 to manage various features of the computing device 500 and one or more programs 524 to provide various functionalities to users of the computing device 500, which include one or more of the features and functionalities described in the present disclosure. In various embodiments, the programs 524 may use on or more machine learning models to provide the functionalities of the agent 110 described herein. One of ordinary skill in the relevant art will recognize that different approaches can be taken in selecting or designing a program 524 to perform the operations described herein, including choice of programming language, the operating system 522 used by the computing device 500, and the architecture of the processor 510 and memory 520. Accordingly, the person of ordinary skill in the relevant art will be able to select or design an appropriate program 524 based on the details provided in the present disclosure.

The communication interface 530 facilitates communications between the computing device 500 and other devices, which may also be computing devices as described in relation to FIG. 5. In various embodiments, the communication interface 530 includes antennas for wireless communications and various wired communication ports. The computing device 500 may also include or be in communication, via the communication interface 530, one or more input devices (e.g., a keyboard, mouse, pen, touch input device, etc.) and one or more output devices (e.g., a display, speakers, a printer, etc.).

Although not explicitly shown in FIG. 5, it should be recognized that the computing device 500 may be connected to one or more public and/or private networks via appropriate network connections via the communication interface 530. It will also be recognized that software instructions may also be loaded into the non-transitory computer readable medium (e.g., memory 520) from an appropriate storage medium or via wired or wireless means.

Accordingly, the computing device 500 is an example of a system that includes a processor 510 and a memory 520 that includes instructions that (when executed by the processor 510) perform various embodiments of the present disclosure. Similarly, the memory 520 is an apparatus that includes instructions that when executed by a processor 510 perform various embodiments of the present disclosure.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the annotator skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A method, comprising:

training an agent via power availability data for a power grid managed by a utility, electricity use data for electrical devices in a household, and an effect on a length of service of a power supply device to optimize a reward function, wherein the reward function rewards:

reducing electricity usage at peak demand times for the power grid according to the power availability data, increasing user satisfaction with activation of the electrical devices, and increasing length of service for a power supply device used to delivery electricity to an electrical load;

deploying the agent to the household that is connected to a power grid managed by the utility to generate a schedule to optimize the reward function for delivery of power from at least one of the power grid and the power supply device to the household; and activating and deactivating the electrical devices for the household according to the schedule, wherein the power supply device, via a transformer, serves a plurality of households, including the household, that the agent is trained to reduce loss of life for according to the electrical load exerted by the household on the transformer while greedily, relative to other houses of the plurality of households, attempting to reduce cost of use and increase user satisfaction for the household.

2. The method of claim 1, wherein the agent uses a Deep Q-network algorithm to generate an approximated Q value for a given tuple of current state, current action, next state, and reward function values.

3. The method of claim 1, wherein the electrical devices include appliances, an electric vehicle, and an energy storage solution.

4. The method of claim 3, wherein the energy storage solution includes an electric vehicle that is disconnected from the household for at least part of a day.

5. The method of claim 1, wherein the power supply device includes a photovoltaic device managed by the household.

6. The method of claim 1, wherein the transformer is managed by the utility operating the power grid.

7. The method of claim 1, further comprising updating the agent based on operational feedback from the household and additional power availability data.

8. The method of claim 1, wherein the schedule is modeled as a Markov Decision Process for an action to take from a current state based on current environmental conditions to reach a prospective next state at an end of a scheduled time period to receive rewards based on an actual next state at the end of the scheduled time period.

9. The method of claim 1, wherein the user satisfaction is measured via user comfort feedback.

10. A system, comprising:

a processor; and a memory, instructions that when executed by the processor perform operations including:

observing, by an agent, environmental states for a first time, the environmental states including states of electrical devices in a household, power availability data form a utility serving the household, and an effect on a length of service of a power supply device;

taking, by the agent, an action for the electrical devices for a second time, subsequent to the first time, based on the environmental states for the first time;

receiving, by the agent, a reward from a reward function for the agent, wherein the reward function rewards:

reducing electricity usage at peak demand times for the utility according to the power availability data, increasing user satisfaction with activation of the electrical devices, and increasing length of service for the power supply device, wherein the power supply device, via a transformer, serves a plurality of households, including the household, that the agent is trained to reduce loss of life for according to an electrical load exerted by the household on the transformer while greedily, relative to other houses of the plurality of households, attempting to reduce cost of use and increase user satisfaction for the household.

11. The system of claim 10, further comprising updating the agent based on operational feedback from the household and additional power availability data.

12. The system of claim 10, wherein the agent uses a Markov Decision Process based on the environmental states to identify what action to take from a first state to reach a prospective next state at an end of a scheduled time period to receive rewards based on an actual next state at the end of the scheduled time period.

13. The system of claim 10, wherein the user satisfaction is measured via user comfort feedback.

14. A computer-readable storage device, including instructions that when executed by a processor perform operations including:

observing, by an agent, environmental states for a first time, the environmental states including states of electrical devices in a household, power availability data form a utility serving the household, and an effect on a length of service of a power supply device;

taking, by the agent, an action for the electrical devices for a second time, subsequent to the first time, based on the environmental states for the first time;

receiving, by the agent, a reward from a reward function for the agent, wherein the reward function rewards:

reducing electricity usage at peak demand times for the utility according to the power availability data, increasing user satisfaction with activation of the electrical devices, and increasing length of service for the power supply device, wherein the power supply device, via a transformer, serves a plurality of households, including the household, that the agent is trained to reduce loss of life for according to an electrical load exerted by the household on the transformer while greedily, relative to other houses of the plurality of households, attempting to reduce cost of use and increase user satisfaction for the household.

15. The device of claim 14, further comprising updating the agent based on operational feedback from the household and additional power availability data.

16. The device of claim 14, wherein the agent uses a Markov Decision Process based on the environmental states to identify what action to take from a first state to reach a prospective next state at an end of a scheduled time period to receive rewards based on an actual next state at the end of the scheduled time period.

17. The device of claim 14, wherein the user satisfaction is measured via user comfort feedback.

* * * * *